Feb. 13, 1923.

S. E. McFARLAND.
STORAGE BATTERY SYSTEM.
FILED NOV. 5, 1919

1,445,025.

Inventor
Samuel E. McFarland
by
*James T. Batchelor*
his Attorney

Patented Feb. 13, 1923.

1,445,025

UNITED STATES PATENT OFFICE.

SAMUEL E. McFARLAND, OF LOS ANGELES, CALIFORNIA.

STORAGE-BATTERY SYSTEM.

Application filed November 5, 1919. Serial No. 335,924.

*To all whom it may concern:*

Be it known that I, SAMUEL E. MCFARLAND, a citizen of the United States, residing at Los Angeles, in the county of Los Angeles, State of California, have invented new and useful Improvements in Storage-Battery Systems, of which the following is a specification.

This invention relates to systems of operation for storage batteries; and relates more particularly to systems wherein it is desired to operate a storage battery upon a charging line and to use different portions of the storage battery simultaneously so as to have available currents of different voltages.

In such systems as these it has heretofore been found very difficult to maintain the battery properly charged in all of its cells; certain cells being more used than others, those most used have usually run down in a comparatively short time. It is an object of the invention to provide a system in which these difficulties are overcome. And I do this by providing a system in which the different parts of the battery may be charged in proportion to the amount of use to which those respective parts are put.

The invention will be best understood from the following detailed description of a simple form of system embodying the invention, reference for this purpose being had to the accompanying drawings, in which—

Figure 1:
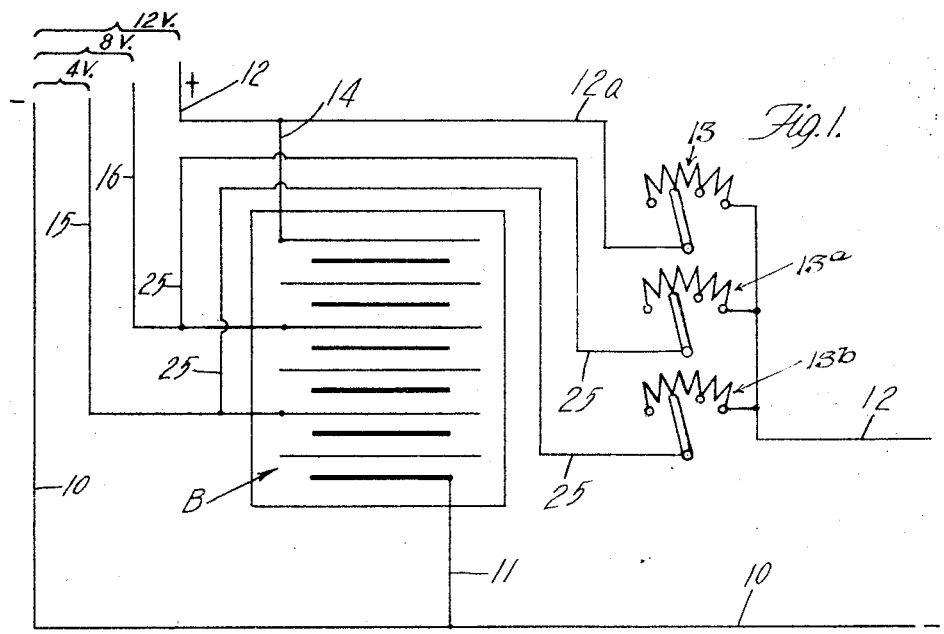
Figure 2:
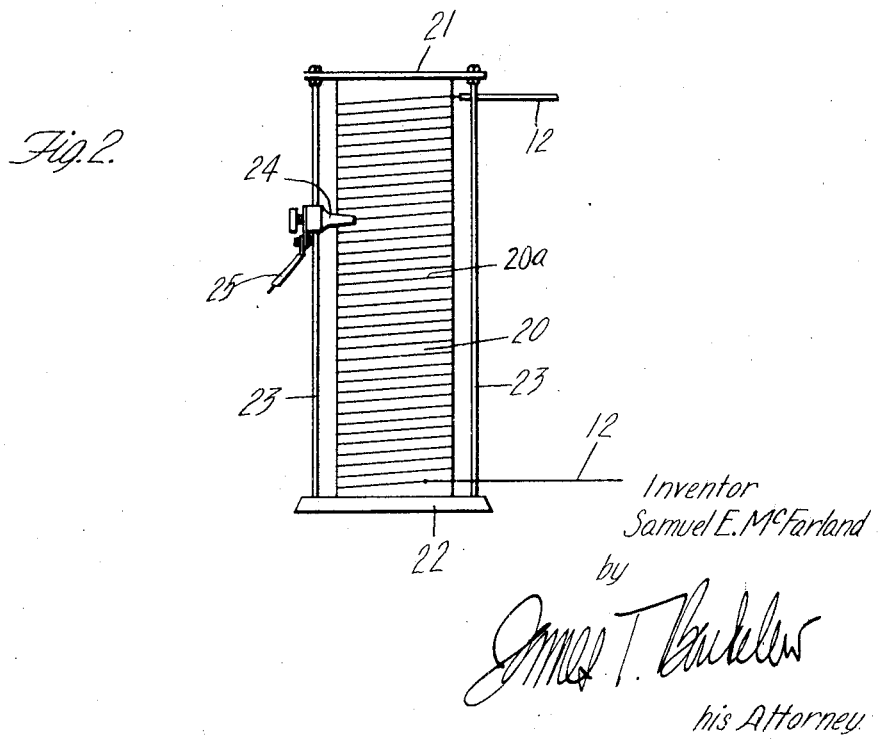

Fig. 1 is a diagram illustrating the general arrangement and electrical connections of the system; and Fig. 2 is an elevation showing a suitable form of resistance element which may be used in the system.

In the drawings I have illustrated diagrammatically at B a storage battery which, in this case, is a battery of six cells capable of delivering about twelve volts. The negative feed wire 10 is connected by branch 11 to the proper side of the battery while the positive feed wire 12 is connected, through a resistance element 13, and wire 12$^a$ and by branch wire 14, to the other side of the battery. The battery as a whole floats between the two circuit wires 10 and 12$^a$. Between the delivery ends of these two wires 10 and 12$^a$ there is of course a voltage of say twelve volts, the voltage of the battery. But between the incoming wires 10 and 12 the voltage may be much higher. Now it is often desirable to lead off from an intermediate point or points on the battery intermediate lead wires as indicated at 15 and 16. These lead wires may be of any suitable number and may be led off at any desired points from the battery, so as to obtain between wire 10 and these other lead wires the desired voltage or voltages. For instance, in the present case these wires 15 and 16 are shown leading off at points to give respectively four volts and eight volts between them and the lead wire 10.

I may provide the resistance elements in the form shown in Fig. 2. Conveniently, the resistance may be supplied in a plurality of elements 13, 13$^a$, and 13$^b$ which may be made by winding the resistance wire as shown at 20$^a$ onto a cylinder 20, the cylinder being held between heads 21 and 22 which are held together by rods 23; and these rods 23 may form a convenient supporting means for adjustable contacts 24 from which wires 25 and 12$^a$ may lead off. In the particular installation here shown I lead off one wire from a suitable point on each of resistance elements 13$^a$ and 13$^b$, these wires 25 connecting into the wires 15 and 16 and thus connecting into the battery at the points where the wires 15 and 16 tap the battery. The resistance elements 13, 13$^a$ and 13$^b$ are in parallel with each other, each connected to feed wire 12.

It is of course well known that while the battery is used in the manner here indicated (that is, current being taken off two or more of wires 15, 16 and 12) the battery section between wire 15 and wire 10 is most used, the battery section between wire 16 and wire 15 is somewhat less used, and the battery section between the point of tapping of wire 16 and the other end of the battery is the least used. Now, my placing the resistance contacts 24 in proper relative positions upon the resistance, I am enabled very easily to adjust the relative as well as actual amount of current fed to each section of the battery so as to keep each section fully charged, and charged uniformly with the other sections, regardless of how much the battery as a whole may be used and regardless of how much more one part of the battery may be used than another.

Having described a preferred form of my invention, I claim:

1. In a storage battery system in which the battery is connected between two main lead charging and discharging wires and in which another lead discharging wire leads from the battery at an intermediate point, a resistance connected into one of the main lead wires to control the charging of the battery as a whole, and a charging wire leading from the lead wire through resistance to the said intermediate point of the battery.

2. In a storage battery system in which the battery is connected between two main lead charging and discharging wires and in which another lead discharging wire leads from the battery at an intermediate point, a resistance in one of the main lead wires to control the charging of the battery as a whole, and a charging wire leading from the lead wire through adjustable resistance to the said intermediate point of the battery.

3. In a storage battery system in which the battery is connected between two main lead charging and discharging wires and in which another lead discharging wire leads from the battery at an intermediate point, an adjustable resistance in one of the main lead wires to control the charging of the battery as a whole, and a charging wire leading from the lead wire through adjustable resistance to the said intermediate point of the battery.

In witness that I claim the foregoing I have hereunto subscribed my name this 28th day of October, 1919.

SAMUEL E. McFARLAND.

Witness:
  VIRGINIA BERINGER.